Jan. 16, 1962 J. R. LLOYD 3,017,207
VEHICLE HUB CONSTRUCTION
Filed Jan. 20, 1958 2 Sheets-Sheet 1
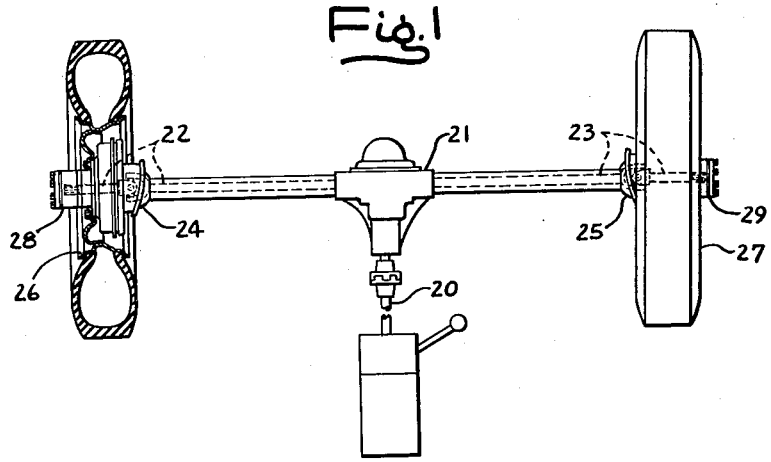
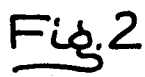
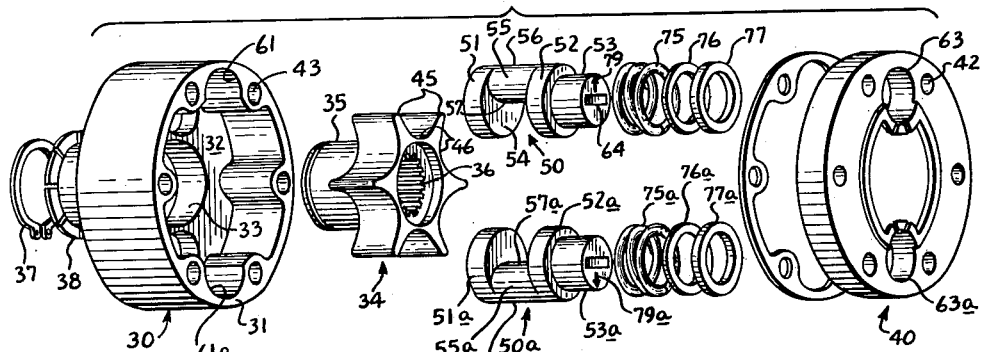
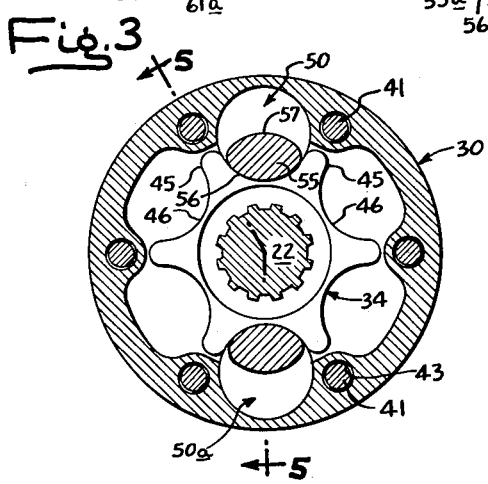
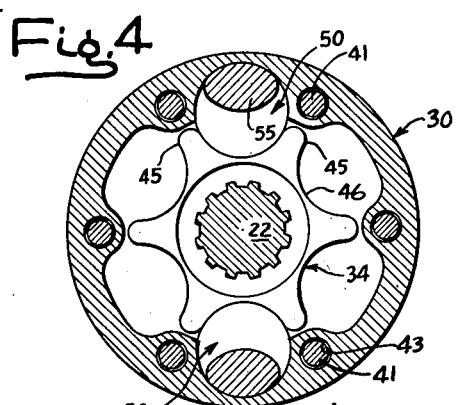
INVENTOR
JAMES RUSSELL LLOYD
by: Carlson, Pitzner, Hubbard + Wolfe
ATTYS.

Jan. 16, 1962 J. R. LLOYD 3,017,207
VEHICLE HUB CONSTRUCTION
Filed Jan. 20, 1958 2 Sheets-Sheet 2
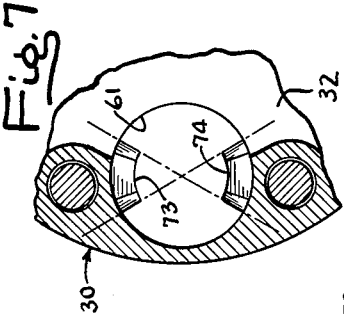
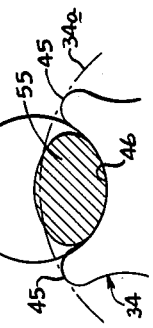
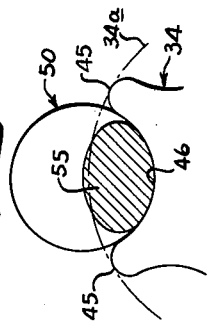
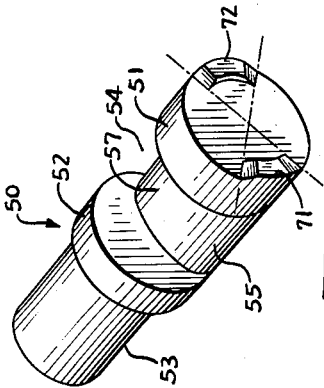
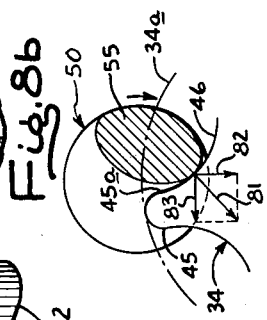
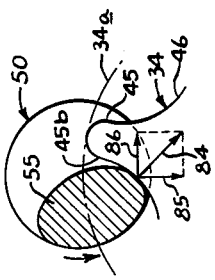
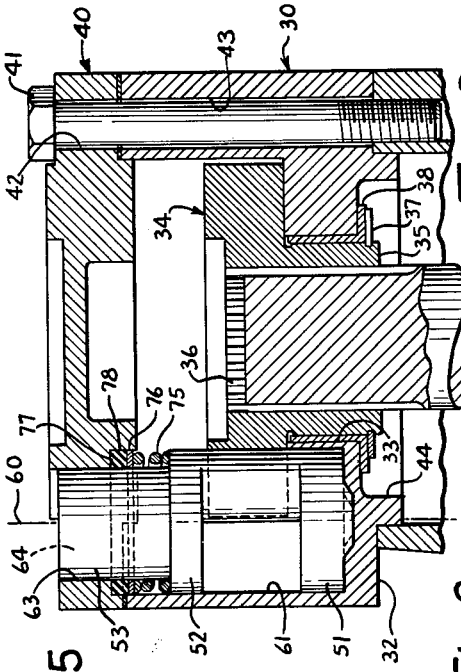
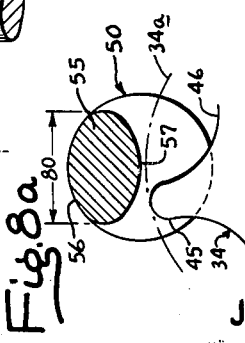
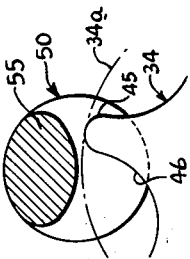
INVENTOR
JAMES RUSSELL LLOYD
by: Carlson, Pitzner, Hubbard + Wolfe
ATTYS.

United States Patent Office 3,017,207
Patented Jan. 16, 1962

3,017,207
VEHICLE HUB CONSTRUCTION
James Russell Lloyd, Denver, Colo., assignor to Cutlas Tool and Manufacturing Company, Lyons, Ill., a corporation of Illinois
Filed Jan. 20, 1958, Ser. No. 709,881
4 Claims. (Cl. 287—53)

This application is a continuation in part of application Serial No. 679,662, filed August 22, 1957, and now abandoned.

The present invention relates to a hub construction for a vehicle wheel and more particular to a novel arrangement for coupling and uncoupling a vehicle driving wheel with respect to a driving axle.

Conventional four wheel drive vehicles such as the well known "Jeep" or "Rover" employ a front differential driven by a longitudinal drive shaft and having laterally extending axles which are coupled to the front wheels of the vehicle through suitable universal joints. Under conditions when "four wheel drive" is not required, the front drive shaft is disconnected from the engine by suitable disconnect gearing included in a transfer case associated with the vehicle transmission. However, even when the drive shaft is thus disconnected, the vehicle front axles must turn with the wheels, accompanied by idle rotation of the universal joints and drive elements within the front differential. While it is true that no power is being transmitted under such conditions, nevertheless the idle rotation is to be avoided because of certain disadvantages which have been recognized for a number of years, including unnecessary wear of the bearings and rotating parts, noise or "whine," frictional drag, especially in cold weather when the lubricant is stiff, increased tire wear, and difficulty of steering.

It has been proposed to provide a disconnect mechanism in the hub of the wheel, thereby to isolate the wheel from the axle, its associated universal joint and differential, during the great majority of the time when "two wheel drive" is adequate, there has, however, been no satisfactory device available to accomplish this, currently available devices being complicated, expensive and subject to malfunctioning as a result of rough usage. Also, conventional devices are difficult to use, requiring that considerable effort be applied to the manual operator for switching from the free to the drive condition, yet subject to breakage when levers or tools are applied. Most important, conventional devices are sometimes blocked against engagement, specifically when the vehicle axle is not properly phased or positioned with respect to the wheel, and to overcome this condition the drive shaft must be rotated by the engine to a new position or the vehicle must be pushed back and forth until register of the locking element can be achieved. Efforts have been made to overcome this condition, but this has simply added to the cost and complexity of the mechanism.

It is an object of the present invention to provide a hub construction for coupling and uncoupling a vehicle wheel with respect to a driving axle which is durable, simple and compact, which comprises a minimum number of parts, and which may be easily and inexpensively manufactured.

It is another object of the invention to produce a hub construction which may be mounted on a vehicle wheel and which in its driving condition, provides a positive, locked coupling between the wheel and the driving axle, a coupling which is free of play and capable of transmitting a high torque, yet which, in its uncoupled condition, enables the wheel to turn freely without imposing any drag upon the axle and associated parts.

It is a further object to provide a coupling device of the above type which may be readily shifted between its disengaged and engaged conditions by an easy manual twisting movement applied by a simple key in the form of a pocket coin or the like.

It is a related and important object of the present invention to provide a hub coupling mechanism for a vehicle wheel which may be shifted from the disengaged condition to the engaged condition regardless of the axle position, i.e., without regard to the phasing between the wheel and the axle. It is a more specific object to provide a novel, manually operated coupling arrangement which automatically positions the axle with respect to the wheel and in which the axle is rotated around into an appropriate position automatically upon simple twisting of the manual operator and with only a light operating force.

It is yet another object of the invention to provide a novel detent arrangement which enables the operating elements to be rotated from one position to another positively and by "feel," the detent mechanism being so constructed and arranged that any localized points of wear are avoided so that transfer between the two conditions may be made thousands of times over the life of the vehicle without wear and without affecting the reliability of the detent. It is an object of the invention in one of its aspects to provide a hub construction which has self contained lubricant but which is effectively sealed against loss of such lubricant, especially around the relatively rotatable manual operators. It is a more detailed object of the invention to provide a novel sealing and detenting arrangement which employs a single spring element.

Other objects and advantages of the invention will become apparent upon reading the attached detailed description and upon reference to the drawings in which:

FIGURE 1 shows in simplified diagrammatic form the front end drive system of a four wheel drive vehicle employing hubs constructed in accordance with the present invention.

FIG. 2 is an exploded perspective view showing the parts of the improved hub.

FIG. 3 is a transverse sectional view taken through the hub under the coupled or locked condition.

FIG. 4 is a transverse section similar to FIG. 3 but showing the positions of the elements when the hub is in its uncoupled condition.

FIG. 5 is a fragmentary longitudinal section taken along line 5—5 in FIG. 3 under locked conditions.

FIG. 6 is a perspective of a locking cam employed in the present device showing the upraised detent elements formed on the end thereof.

FIG. 7 is a fragmentary view looking down into the bore occupied by the locking cam of FIG. 6 and showing the mating detent elements.

FIGS. 8a–8d are stop motion figures showing the movement of the cam to bring about axle register and locking when the star wheel is out of register in one direction.

FIGS. 9a–9d are similar to FIGS. 8a–8d but show the cam movement when the star wheel is out of register in the opposite direction.

While the invention has been described in connection with a preferred embodiment it will be understood that I do not intend to limit myself to the particular embodiment shown but intend to cover equivalent and alternative constructions and uses defined by the spirit and scope of the claims appended hereto.

Turning now to the drawings, FIG. 1 shows, in simplified diagrammatic form, a typical front end drive used in a four wheel drive vehicle including a drive shaft 20, a differential 21 and axles 22, 23. Each of the latter are of two part construction, with articulation being provided by universal joints 24, 25 respectively. The view omits any showing of the regular wheel support or steering linkage.

Mounted at the ends of the axles are vehicle wheels 26, 27 which are, in accordance with the invention, coupled to the ends thereof by means of hubs 28, 29, the hub 28 being taken by way of example in the discussion which follows.

As shown in the exploded view FIG. 2 and in the subsequent figures in the series, the hub, in the preferred form of the invention, includes a hollow cylindrical body portion 30 having a sidewall 31 and a bottom or mounting wall 32 provided with an aperture 33.

Journaled in the aperture 33 is a driving member 34 having a sleeve portion 35 and which is centrally splined as indicated at 36 for coupling to the end of the axle 22, it being understood that the end of the axle is matingly splined in the conventional way. The driving member 34 is held in place by means of a snap ring 37 fitted into a suitable groove and which bears against a washer 38 of nylon or the like.

For the purpose of enclosing the body member 30 a cover plate 40 is provided, and to secure the entire assembly to the flange of the wheel, a ring of bolts 41 are used which extend through holes 42 bored in the cover plate and which are in register with holes 43 in the hub body. The latter, in turn, register with holes in the wheel flange, permitting the bolts to extend through the entire assembly as shown in FIG. 5. An annular ridge 44 on the backside serves to center the unit in the wheel flange. When the bolts are secured the hub and wheel become substantially integral with one another, and a suitable gasket interposed between the body 30 and the cover 40 insures against leakage of lubricant at the joint.

In accordance with the present invention, the driving member 34 is in the form of a star wheel, and a cylindrical locking cam is employed which is journaled in the hub body for movement of the lobe of the cam between a disengaged position in which it is free of the star wheel and an engaged or locking position in which the lobe is in registering engagement with the star wheel and nestled between adjacent points thereon. In the present instance the star wheel configuration of the driving member 34 is defined by a series of symmetrically spaced, narrow points indicated at 45, and which are six in number. Defined by the points and lying between them are series of scallops indicated at 46 having a circular profile and the function of which will become clear as the discussion proceeds. Mounted for rotation about an axis parallel to the star wheel and lying substantially at the periphery 34a thereof is a cylindrical cam 50 having cylindrical bearing portions 51, 52 and a neck or extension 53. The central portion of the cam 50 is cut out or relieved at 54 to provide an eccentric lobe 55 of approximately oval shape. The outer surface 56 of the lobe is cylindrical, preferably coinciding with the cylindrical wall of the original piece of stock from which the cam is made, and the inner surface 57 of the lobe coincides approximately with the axis of rotation.

Prior to discussing the novel cooperation which exists between the cam 50 and the star wheel 34, more detailed attention may be given to the mounting of the cam within the hub body. For defining the axis of rotation 60 of the cam, the body is bored out as indicated at 61. The bearing portion 51 of the cam is seated in the bore. At the upper end the bearing portion 52 rides in the bore and is captive therein in spite of the fact that the bore, through a substantial portion of its length, is open-sided. The neck or extension 53 of the cam, which is of reduced diameter, extends beyond the bearing 52 through a bore 63 formed in the cover plate 40. This provides access to the cam for shifting it between engaged and disengaged positions and also provides additional bearing area. Conveniently, an arcuate slot 64 may be machined in the end of the cam for turning by a small key or for insertion of a pocket coin for turning purposes if desired.

For defining alternative 180 degree positions of the cam 50, a novel detent arrangement is used which is shown in detail in FIGS. 6 and 7. In accordance with the invention, detent surfaces are located at the end face of the cam member and cooperate with detent surfaces formed in the bottom of the bore 61 in which the cam member is seated. Specifically, the cam member 50 has a pair of sector-shaped, upraised lands 71, 72, each of which has radially-alined ends smoothly tapered into the body of the cam 50 and each of which occupies an angular distance of about 60 degrees. The bottom of the bore is, moreover, suitably recessed to define mating detent grooves 73, 74 which also have tapered, radially alined ends and occupy an arc of 60 degrees. This defines two possible seated positions for the cam which are 180 degrees apart. In order to maintain the cam seated in its set position, a coil spring 75 is provided surrounding the neck 53 of the cam and which presses outwardly against a washer 76 seated with respect to the cover plate 40. In accordance with one of the more detailed features of the present invention, the bore 63 in the cover plate is sealed by means of a sealing washer 77 formed of oil-resistant synthetic rubber and which is seated in an annular groove 78. It will be apparent that with the device assembled as shown (FIG. 5) the coil spring 75 forms a dual function; it reacts downwardly to keep the detented surfaces in engagement and upwardly to provide an axial force upon the resilient sealing washer 77, thereby to expand such sealing washer laterally into sealing contact with the neck portion 53 of the cam which it surrounds. The friction provided at the sealing surface plus the detenting force provided by the detents 71–74 is sufficient to insure that the cam remains in the set position, yet the force is sufficiently light so that the cam may be easily turned by inserting a coin or other key into the slot 64 at its exposed end.

Since the ends of the detent elements are radially oriented, contact takes place over a substanial area when the cam is turned; this avoids localized wear and insures long life.

An index pointer 79 (FIG. 2) is formed in the visible outer end of the cam to indicate graphically to the operator the cam position, i.e., whether engaged or disengaged.

In accordance with one of the features of the present invention, not only is the cam 50 pivoted about an axis 60 lying in the vicinity of the periphery 34a of the star wheel, but the effective width or span is substantially greater than the width of the points 45 of the star wheel so that rotation of the cam is effective to impart rotation to the star wheel regardless of the initial phase position of the star wheel, thereby to bring star wheel around into register with the lobe of the cam. The importance of this relationship and its effect upon the operation of the device will be apparent upon considering two conditions of non-register. In FIGS. 8a–8d the star wheel is to the right of the desired registering position while in FIGS. 9a–9d the star wheel is to the left of the registering position. The operation of the device is the same regardless of the amount which the star wheel may be displaced to right or left.

Thus as shown in FIG. 8a the approximate span or effective width of the cam lobe is indicated at 80, such width substantially exceeding the width of the adjacent point 45 of the star wheel. The elements are shown in disengaged position as they would exist after the four wheel drive vehicle has been driven along a high speed roadway and just prior to heading into more rugged terrain requiring driving by all four wheels. At this juncture the driver of the vehicle stops, gets out, and rotates the cam 50 in a clockwise direction using the easily accessible slot 64. Clockwise rotation causes the cam lobe 55 to rotate downwardly in the direction of the arrows against the scalloped sidewall 45a of the point 45. The resultant force, indicated in the form of vector 81, is directed at an angle, having a radial component 82 as well as a large tangential component 83. The tangential component causes rotation of the star wheel accompanied by the rotation of the axle to which it is attached. Clockwise movement of the cam is continued, accompanied by further movement of the star wheel through the condition shown in FIG. 8c until a condition of register, FIG. 8d, is achieved in which the cam lobe 55 is nestled in the scallop between the adjacent points 45 of the star wheel. The condition is indicated to the operator not only by a suitable indicator located at the visible end of the cam but also by feeling the detent drop into place, the force of the detent being sufficiently strong, as stated, to maintain the elements in engagement.

Assuming that the star wheel 34 is initially to the left of the position of register, the cam is simply turned counter-clockwise instead of clockwise as shown in FIGS. 9a–9d. Thus upon contact with the opposite sidewall 45b of the point 45, a force indicated by the vector 84 is created having a component 85 and a tangential component 86 which causes the star wheel to be urged to the right or clockwise. The movement continues as indicated in FIG. 9c until the condition of register shown in FIG. 9d is achieved.

It is to be particularly noted that there is no possible condition of blockage in which it would be impossible to rotate the cam 50 either in one direction or the other. In practice the operator attempts operation in one direction. If rotation in that direction is solidly blocked, he simply rotates the cam in the opposite direction which exerts a tangential force against the star wheel to establish the desired condition of locking register. Thus being able to couple or "lock up" the hub is no longer a matter of "lucky" positioning of the axle as in the case of prior art coupling devices, and no longer is it necessary to engage the engine or to move the vehicle until a condition favorable for lock-up is achieved. In short, in the present device there is no conceivable condition which would prevent the cam from being rotated in at least one of the two directions to produce the condition of positive coupling illustrated in FIGS. 8d and 9d. The mechanical advantage is high so that fingertip pressure is adequate.

Moreover, since in the preferred form of the device the scallop between the points of the star wheel is circular and conforms to the outer surface of the cam lobe, all looseness or play is eliminated and a tight, positively-driving joint is achieved. The device is inherently capable of transmitting more torque than the vehicle wheel is capable of exerting with respect to the ground.

While the invention has been discussed above in connection with a single cam 50, in the preferred form of the invention two cams are employed located diametrically opposite from one another, and such cams may be shifted separately between the disengaged and locked conditions. Corresponding elements of the second cam and its associated parts are numbered the same as in the case of the cam 50 but with subscript "a" added. If desired, both cams may be rotated at the same time to produce additive torques on the star wheel, and to facilitate rotation of the star wheel under stiff, cold weather conditions. Location of duplicate camming elements in symmetrically spaced positions with respect to the wheel axis is desirable since it insures that the drive forces are symmetrically balanced within the device. From the machinist's point of view the present construction is particularly advantageous since it enables accurate control of critical dimensions to insure that the torque loading is borne equally by each of the cams.

Experience indicates that the device is substantially wear and injury proof. The massive cross sections and large bearing areas, which are in startling contrast to the compactness of the device, are capable of withstanding all conceivable shocks and overloads which may be encountered in practice. Moreover, torque overloads are completely incapable of switching the device from its locked condition to its alternate or disengaged condition and radial components of force are both minimized and effectively dissipated.

As will be apparent to one skilled in the art, the present device is of arresting simplicity, employing an absolute minimum number of parts, the main parts being susceptible of economical formation by modern casting procedures. As stated, the device is inherently compact and durable and may be employed for long periods of time under the most rough operating conditions encountered in the field. The device achieves all of the advantages which have been claimed for prior art hubs in addition to the important features which distinguish the present hub. Preferably the device is installed in the factory at the time that the vehicle is assembled, but it is one of the features of the present device that its usage is almost universal, depending only upon such mounting factors as bolt hole spacing and spline size enabling it to be installed without help of a mechanic and within minutes on vehicles not factory-equipped.

While the invention has been described in connection with a star wheel as the driving element, it will be apparent to one skilled in the art that the invention is not so limited but would include arrangements in which the pointed drive element is the driven element. Moreover, while the invention has been described in connection with a hub construction for a vehicle and is particularly well suited to meet the special problems of such usage, it will be appreciated by one skilled in the art that the device is not limited to use in a vehicle but may be applied wherever it is desired to couple together driving and driven elements and where positive engagement and disengagement must be brought about with light manual forces and independently of the phasing or positioning of the driving and driven elements at the time of engagement.

I claim as my invention:

1. In a hub construction for disengageably interconnecting a driving axle with the wheel of a vehicle, the combination comprising a hollow cylindrical body, a star wheel mounted therein for relative rotation and having a plurality of symmetrically spaced points defining scallops therebetween of circular contour, said body and star wheel being adapted for connection to said wheel and axle, a cylindrical cam member mounted in said cylindrical body and rotatable in either direction about an axis located adjacent the periphery of the star wheel, said cam member being relieved on one side to provide clearance for the points on said star wheel when the cam member is in a first angular position and defining an off-center lobe which is rotated into register with one of said scallops when the cam member is rotated 180 degrees for locking said star wheel relative to said cylindrical body, said lobe having a span substantially exceeding the width of said star wheel points.

2. In a hub construction for disengageably interconnecting a driving axle with the wheel of a vehicle, the combination comprising a body member, a star wheel mounted therein for relative rotation and having a plurality of symmetrically spaced points defining scallops therebetween, said body and star wheel being adapted for connection to said wheel and axle, a cam mounted in said body member at the periphery of said star wheel and rotatable in either direction about an axis parallel thereto, said cam having an eccentric lobe rotatable between an engaged position in which the lobe mates with one of said scallops in said star wheel and a disengaged position in which the lobe is rotated out of the path of movement of the points of said star wheel, said lobe having a span substantially exceeding the width of said star wheel points, and accessible means for manually rotating said cam between its engaged and disengaged positions.

3. In a hub construction for disengageable coupling of a vehicle wheel and axle, the combination comprising a hollow cylindrical member adapted for securing to a flange of a vehicle wheel, a star wheel mounted therein for relative rotation, said star wheel being adapted for splined connection with the vehicle axle and having a plurality of symmetrically spaced points defining scallops therebetween of circular contour, a plurality of cylindrical cam members symmetrically mounted in said cylindrical body at the periphery of said star wheel and rotatable about axes parallel thereto, said cam members having eccentric lobes rotatable between engaged positions in which the lobes smoothly mate throughout a substantial area with corresponding scallops in said star wheel and disengaged positions in which the lobes are out of the path of movement of the points of said star wheel, a cover plate for said cylindrical body, said cam members being axially extended through said cover plate for access by an operator for movement between the disengaged and engaged positions, and detent means associated with said cam members for maintaining the cam lobes in their set positions.

4. In a hub construction for disengageably interconnecting a vehicle wheel with an axle, the combination comprising a hollow cylindrical body member having means for attaching the same to said wheel, a star wheel rotatably mounted in said body member and having means for attaching the star wheel to the end of the vehicle axle, said star wheel having points defining scallops therebetween of circular contour, a cam having a lobe and being mounted in said cylindrical body for rotation about an axis parallel thereto, said cam having an axis of rotation positioned at the periphery of said star wheel and with the lobe of the cam offset from said axis of rotation so that the cam may be rotated between a disengaged position in which the lobe is clear of the points of said star wheel and a locking position in which the lobe occupies the scalloped space between adjacent points on said star wheel, the width of the lobe substantially exceeding the width of the points on said star wheel so that upon turning of the cam at least one of its directions from its disengaged position, the lobe of the cam will strike the side of at least one of said points to apply a tangential component of force thereto causing the starwheel to be rotated around into registering position with respect to said cam regardless of the initial position of said star wheel.

References Cited in the file of this patent

UNITED STATES PATENTS

| | | |
|---|---|---|
| 1,044,055 | Johnson et al. | Nov. 12, 1912 |
| 1,501,422 | Strout | July 15, 1924 |
| 2,522,881 | Lindner et al. | Sept. 19, 1950 |
| 2,570,849 | Patrick | Oct. 9, 1951 |
| 2,751,055 | Dodge et al. | June 19, 1956 |
| 2,854,111 | Simonsen | Sept. 30, 1958 |

FOREIGN PATENTS

| | | |
|---|---|---|
| 223,904 | Great Britain | 1926 |